United States Patent

[11] 3,582,558

[72] Inventor Alexander Jurczak
Oakbrook, Ill.

[21] Appl. No. 709,858
[22] Filed Feb. 19, 1968
[45] Patented June 1, 1971
[73] Assignee International Telephone and Telegraph Corporation

[54] TICKETING CONTROL UNIT
11 Claims, 9 Drawing Figs.

[52] U.S. Cl. .......... 179/7.1
[51] Int. Cl. .......... H04m 15/04
[50] Field of Search .......... 179/7.1 TP, 7.1; 346/20, 80; 340/172.5

[56] References Cited
UNITED STATES PATENTS
2,531,622 11/1950 Hague et al. .......... 235/61.7
2,991,450 7/1961 Flint .......... 340/172.5

*Primary Examiner*—Kathleen H. Claffy
*Assistant Examiner*—Jan S. Black
*Attorneys*—C. Cornell Remsen, Jr., Percy P. Lantzy, J. Warren Whitesel, Phillip A. Weiss and Delbert P. Warner

ABSTRACT: Ticketing control units, including means for recording date, connect time and disconnect time of telephone calls. The units also calculate elapsed time of telephone calls, reusing information storage areas used in recording connect and disconnect times to reduce equipment size.

INVENTOR
ALEXANDER G. JURCAZAK
BY
Alter and Weiss
ATTORNEYS

TICKETING CONTROL UNIT

This invention relates to automatic toll ticketing systems and more particularly to ticketing control units used in such systems.

Most fields of endeavor, in the relatively recent past, have experienced a rapid movement toward automation. The moves toward automation have been especially pronounced and probably longer lived in the field of telecommunication. Part of the automating of telecommunications has been manifested by the introduction and use of direct distance dialing for toll calls.

One of the prime requirements for automating toll calls is the necessity for automatically computing the time and charges of the call. This is accomplished with ticketing equipment. Ticketing equipment generally comprises memory units for registering the calling and called numbers, a clock-calendar for providing the date and the connect and disconnect times of the call, a computer for computing the elapsed time of the call, a printer or perforator for preparing the actual ticket for billings, and a ticketing control unit to direct the activities of the ticketing equipment.

The originally used ticketing control units were unduly complicated and expensive in that they actually were combinations of control units, memory units and computer units. Eventually, the large ticket control units were broken down to the passive circuitry necessary merely to control the other units. The memory units were equipped to compute the elapsed time from the connect times and disconnect times supplied by the clock calendar. Such memory units are unduly complicated by the necessary computing equipment. In addition, the memory units have to be held for the duration of the call to obtain a complete transfer of the information to complete the ticket.

It is an object of this invention to provide active ticket control units that are capable of performing certain computations to thereby reduce the size of the memory unit and to reduce the memory unit holding time.

A related object of the invention is to provide ticket control units having unique computing equipment.

A further object of the invention is to provide ticket control units which reuse component equipment to thereby minimize the number of components necessary.

Yet another object of this invention is to provide ticket control units equipped to compute the elapsed time of toll or monitor calls.

A related object is to provide computer units that compute the elapsed time minutes, hundreds, tens and units from the connect time and disconnect times received in hours, tens and units and in minutes, tens and units. The inventive equipment provides for accomplishing the computations even when the connect time is prior to 12M and the disconnect time is after 12M, or when the disconnect time is less than the connect time.

A preferred embodiment of the ticketing control unit comprises means for receiving from the memory unit: the called number, the calling number, the connect time and the memory number. The memory is then released. The control unit which is connected to both the memory and the clock units simultaneously or sequentially receives the disconnect time and the date from the clock-calendar. The control unit then computes the elapsed time and transfers the elapsed time information to the ticket printer or perforator equipment.

The elapsed time computation is performed by subtracting the connect time from the disconnect time, which times were previously recorded into the ticketer in two-out-of-five codes and translated to digital form. Means are provided to assure that the minute and hour codes do not exceed allotted units and to provide for calls started before 12M and finished after 12M.

The above-mentioned and other features and objects of this invention and the manner of obtaining them will become more apparent and the invention itself will be best understood by reference to the following description of the embodiment of the invention taken in conjunction with the accompanying drawings wherein:

FIG. 1 illustrates in block diagram form an automatic toll ticketing system, utilizing the subject invention.

FIGS. 2—8 illustrate schematically essential circuitry of the inventive ticket control unit, and FIG. 9 illustrates a mode of connecting FIGS. 2, 5 and 6 inclusive, to form a ticketing control unit in conjunction with the circuitry of FIGS. 3, 4, 7 and 8.

FIG. 1 shows in block diagram form one example of an automatic toll ticketing telephone system that is useful for explaining how the subject invention system that is useful for explaining how the subject invention operates. The system includes a plurality of incoming junctors 11, and a plurality of outgoing junctors 12. The junctors terminate trunks connected to exchanges.

Well-known switching equipment, indicated at 13, is used to interconnect the incoming and the outgoing junctors. The switching equipment 13 is controlled by the marker 14.

In the well-known manner, when a calling party at a local office dials a number indicating a called party at a distance exchange, the calling party is coupled to an incoming junctor in the central exchange. A further finder, such as junctor finder 16, connects to the incoming junctor that is in a condition demanding service to connect the incoming junctor to an idle register such as register 17 through register finder 18. The appropriate information is stored in the register 17 which may have translating equipment (not shown) associated therewith. The register 17 is shown linked to a connecting control bus 19 (shown by a dotted line) through coupler 21.

The registered information is transmitted to an idle marker such as marker 14, through bus 19 and controls the switching equipment 13 to connect the incoming junctor demanding service to the called party through an outgoing junctor of the outgoing junctors 12.

If the dialled information indicates a ticketing call or every fifth call, for example, then the incoming call is connected to the ticket equipment through the switching equipment and the obvious path shown in the drawing of FIG. 1.

The ticketing equipment comprises a memory unit 22, the inventive control unit 23, shown as a double lined block, a clock-calendar unit 24, and a printer or perforator unit 26.

The memory unit 22 is coupled to the outgoing junctor through line 27 and to the bus 19 through link 28. The memory unit 22, the control unit 23, and the clock 24 are interconnected through link 29. The printer or perforator unit 26 is coupled directly to the control unit 23 through line 30.

In operation, the memory unit 22 receives the calling and called numbers from the register through bus 19 and link 28. The memory 22 through its connections to the incoming and outgoing junctors can detect connect and disconnect times. At connect, the memory 22 unit is connected to the clock-calendar unit is then released. At disconnect, the control unit 23 is connected to both the memory unit 22 and the clock-calendar unit 24. It then records and stores the disconnect time and date received from the clock-calendar unit 24 and releases the unit 24. The control unit 23 then records and stores the connect time, the calling number, the called number and the memory number.

It should be understood that each control unit serves a plurality of memory units. In one known system, for example, there are 16 memory units for each control unit. Thus, for servicing purposes, the memory number is recorded. The multiplicity of memory units points out an advantage of Applicant's unique ticketing control unit, since it enables simplification of the memory units and insures that the connect time of the memory units per call are significantly reduced.

The ticketing control unit 23 then releases the memory unit and computes the elapsed time and transmits the elapsed time, the calling number, called number and memory number to the printer or perforator to use in preparing the ticket.

FIGS. 1—8 schematically show how the inventive ticketer control unit performs the elapsed time calculation; FIG. 9 shows how FIGS. 2, 5 and 6 are interconnected to perform the control functions in conjunction with the circuitry of FIGS. 3, 4 and 7, 8.

The unique functioning of the ticketing control unit will be explained using the circuitry shown in FIGS. 2—8. Responsive to all of the information being received from the memory and clock-calendar stored in the ticketing control unit relay K1 (FIG. 2) operates to prepare the ticketing control unit to perform the necessary computations.

The connect time storage relays are the quintet K2*a/e*—K5*a/e* shown in FIG. 5. Each of the storage relays depicted represents a set of five relays enabling the storage of the connect time in the well known two-out-of-five code. The first two sets of relays K2*a/e* and K3*a/e* are used for storing the connect time hours in tens and units respectively. The next two sets of relays K4*a/e* and K5*a/e* are used for storing the connect time minutes in tens and units respectively. Relay sets K6*a/e* and K7*a/e* are used for storing the memory unit number in tens and units respectively.

BRIEF DESCRIPTION OF THE TICKET CONTROL UNIT COMPUTATION

The new control units first computation is the subtraction of the connect time minute units from the disconnect time minute units received from the memory and clock-calendar and stored in the storage relays. The first operation is reading the connect time minute units stored in a two-out-of-five code and translating this to a decimal code by marking a set of digit relays. Thereafter, the disconnect time minute units is read. A contact and diode field automatically performs the subtraction responsive to reading the disconnect time from the storage relays. The disconnect storage relays are then released. The elapsed time minute units code is then restored in the disconnect time minute unit code storage relays. The reuse of the storage relays minimizes the number of relays required.

The evaluation of the elapsed time in the minute tens code is similar to the evaluation of the elapsed time in the minute units code except that means are used to assure that the marking of the elapsed time tens code will not exceed five.

The evaluation of the elapsed time hour units code is similar to the evaluations of the elapsed time minute units code except that means are provided for adding 4 hours to the connect hour units code if the disconnect time is made after 12 midnight with the connect time made prior to 12 midnight, when a 24-hour clock is used.

There also may be provided means for assuring that there is a 5-hour maximum evaluation. If it is noted by the computing equipment that more then 5 hours of elapsed time has occurred, the computation is then ended and the perforating or printing equipment is notified that the time of conversation or the elapse time is greater than 5 hours.

During the subtraction if it is found that the disconnect digit is less than the connect digit, means are provided to reduce the next disconnect digit by one and thereby correct for the larger connect time.

Finally, an elapsed time addition has to be made wherein the elapse time is converted strictly to a minutes, hundreds, tens and units code. Here again, reuse is made of the storage relays and automatic addition is provided through a contact and diode field.

DETAILED DESCRIPTION OF THE TICKET CONTROL UNIT COMPUTATION

Elapsed Time Minute Units Computation

Means are provided for reading the stored connect time. More specifically, relay K1 operates to indicate that all the required information is stored and to initiate the computations of the elapsed time. The operate circuit for relay K1 extends from battery through the closed contacts 31 of a relay not shown and operated contacts 32 of a hold relay (not shown) to ground.

Means such as a set of relays K8, K9, K10, K11 and K12 operating as a stepping relay team, are provided for controlling the sequences of the computations. Thus, for the first sequence which is a read out operation, relay K8 is operated over a circuit that extends from battery through the winding of relay K8, through normally closed contacts K9–1, K10–1, K11–1, and K12–1 of the sequence relays and through the normally open contacts 32 of the operated hold relay (not shown) to ground.

Figure 1:
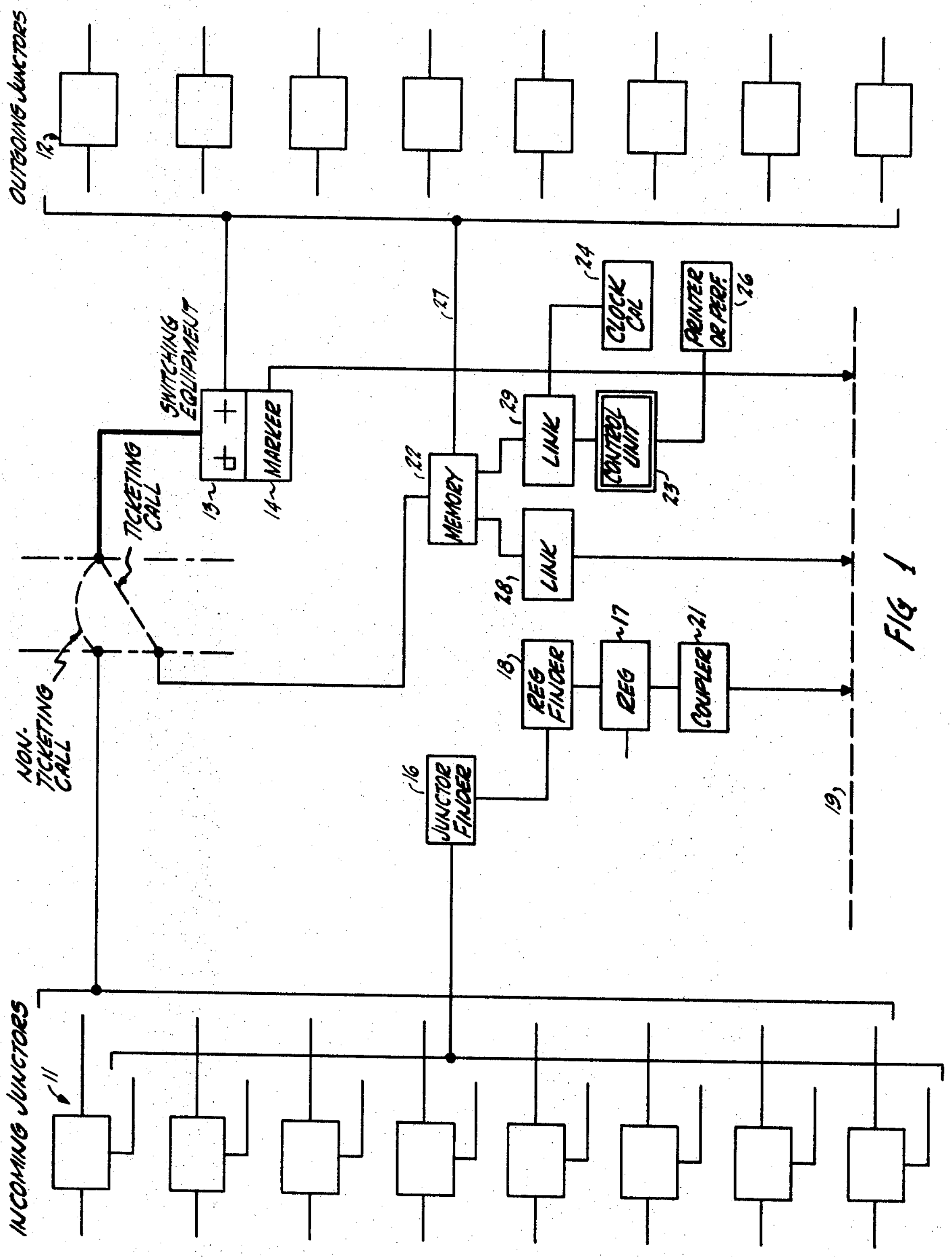
Figure 2:
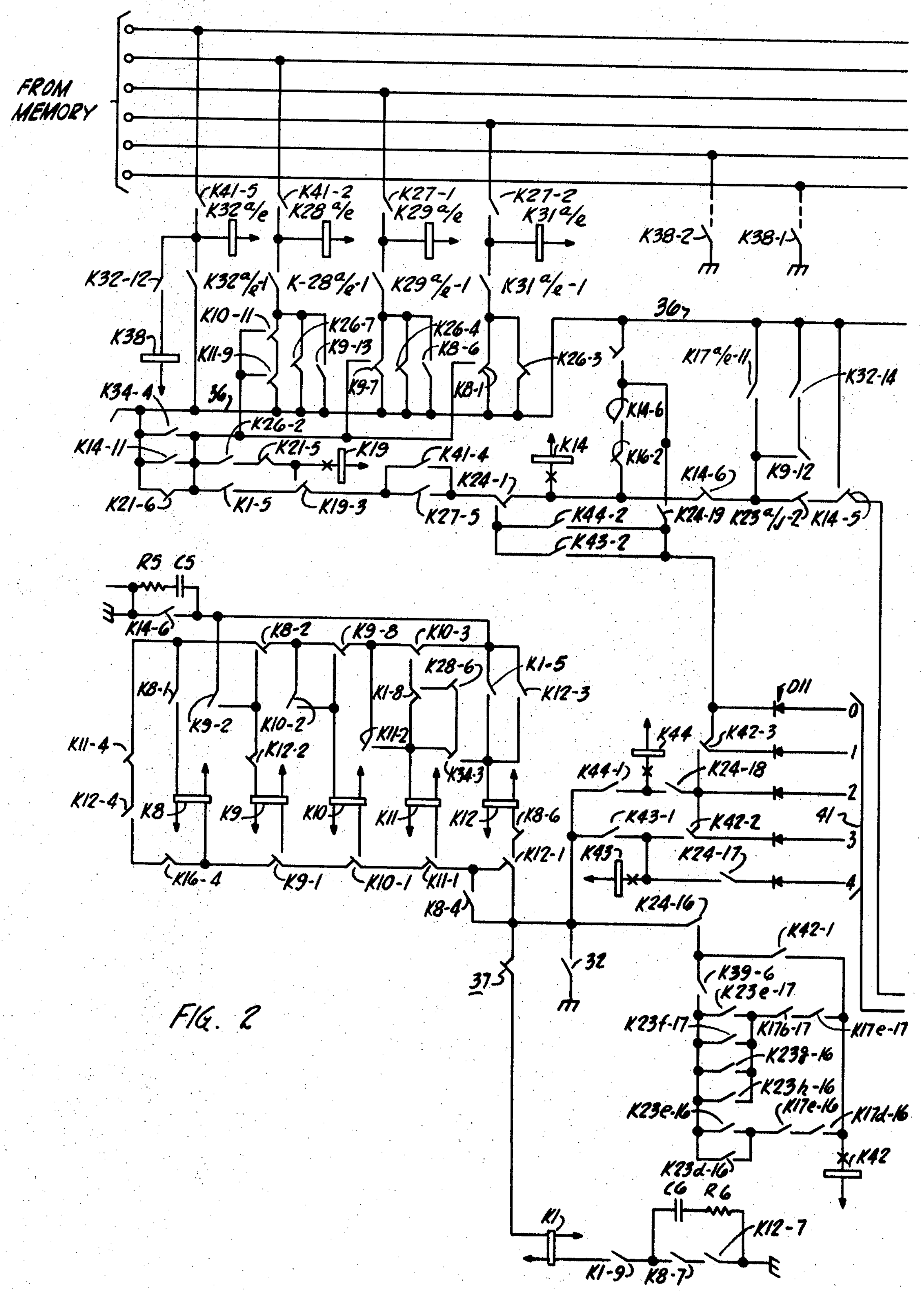
Figure 5:
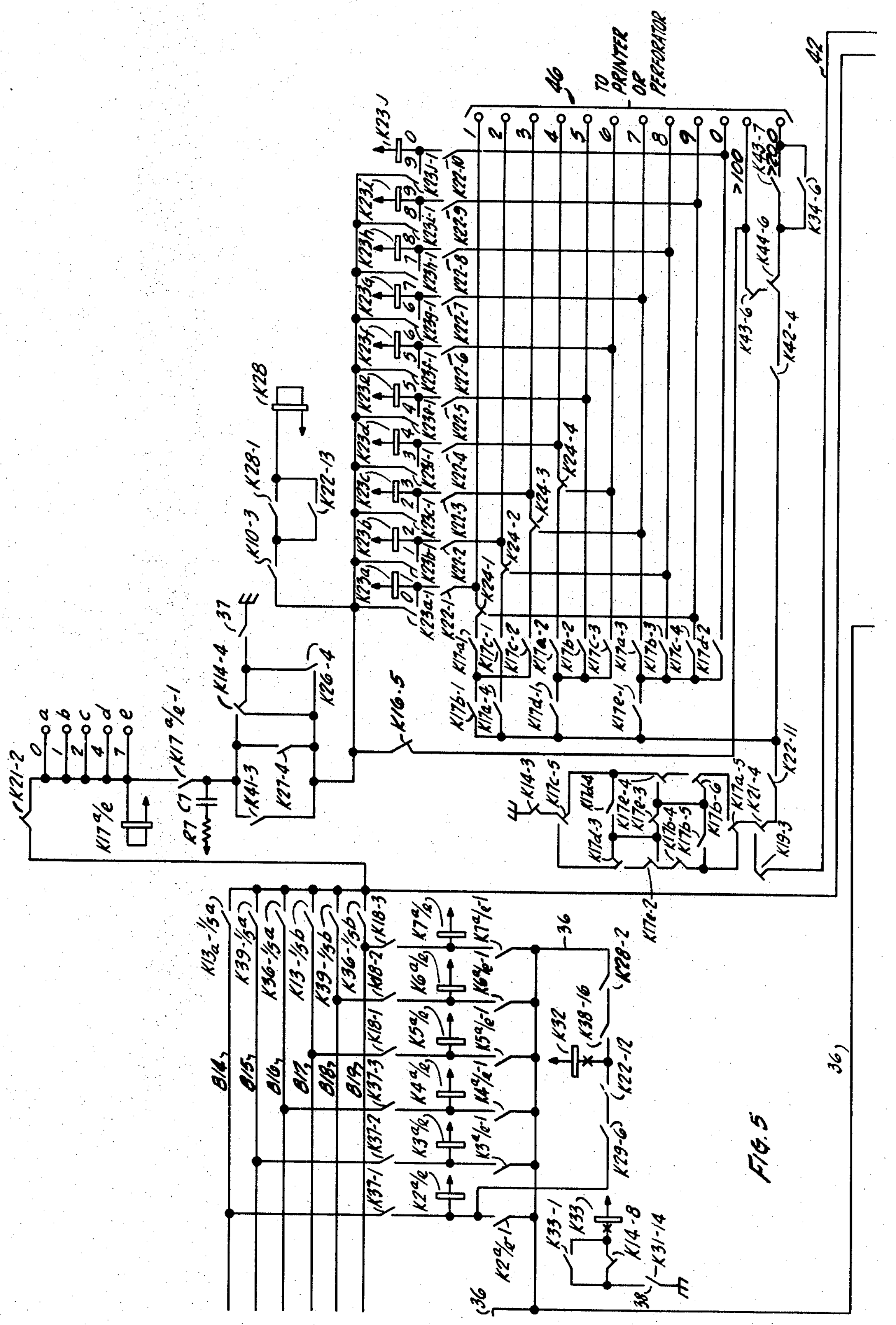

Means, such as selection relays K13, and K14 are provided to select the desired group of storage relay contacts for reading the information stored therein. More particularly, relay K13 (FIG. 3) is operated responsive to the operation of relays K1, K8 over a circuit that extends from battery through the winding of relay K13, the closed normally open contacts K1–1, K8–1, the normally closed contacts K14–1 of relay K14 (FIG. 2) through normally closed contacts K16–1 of relay K16 (FIG. 8) and contacts 33 of the hold relay (not shown). The operation of relay K13 among other things, closes contacts K13-1/5 (FIG. 5) to connect the storage busses B14, to the read storage tank set of relays K17*a/e*. The busses B14 are connected to storage tank relays K32*a/e* and K2*a/e*.

Means such as relay K18 (FIG. 4) are provided for selecting between relays K32*a/e* and K2*a/e*. More specifically relay K18 operates responsive to the operation of relay K13 to connect the contacts of relay sets K2*a/e* to the storage busses. Relay K18 operates over a circuit that extends from battery, through resistor R1, the coil of relay K18 to point 35*a*, through cable 35 to point 35*a* on the other side of the cable through normally closed contacts K12–2, closed normally open contacts K13–6, closed normally open contacts K1–2, closed contacts K11–2, normally closed contacts K19–1, closed contacts K21–1, normally closed contacts K14–2, and through the closed normally opened contacts K1–3 to ground. Contacts K13–1/5*a* close to couple the set of relay contacts K2*a/e*–1 to the busses B14.

Figure 6:
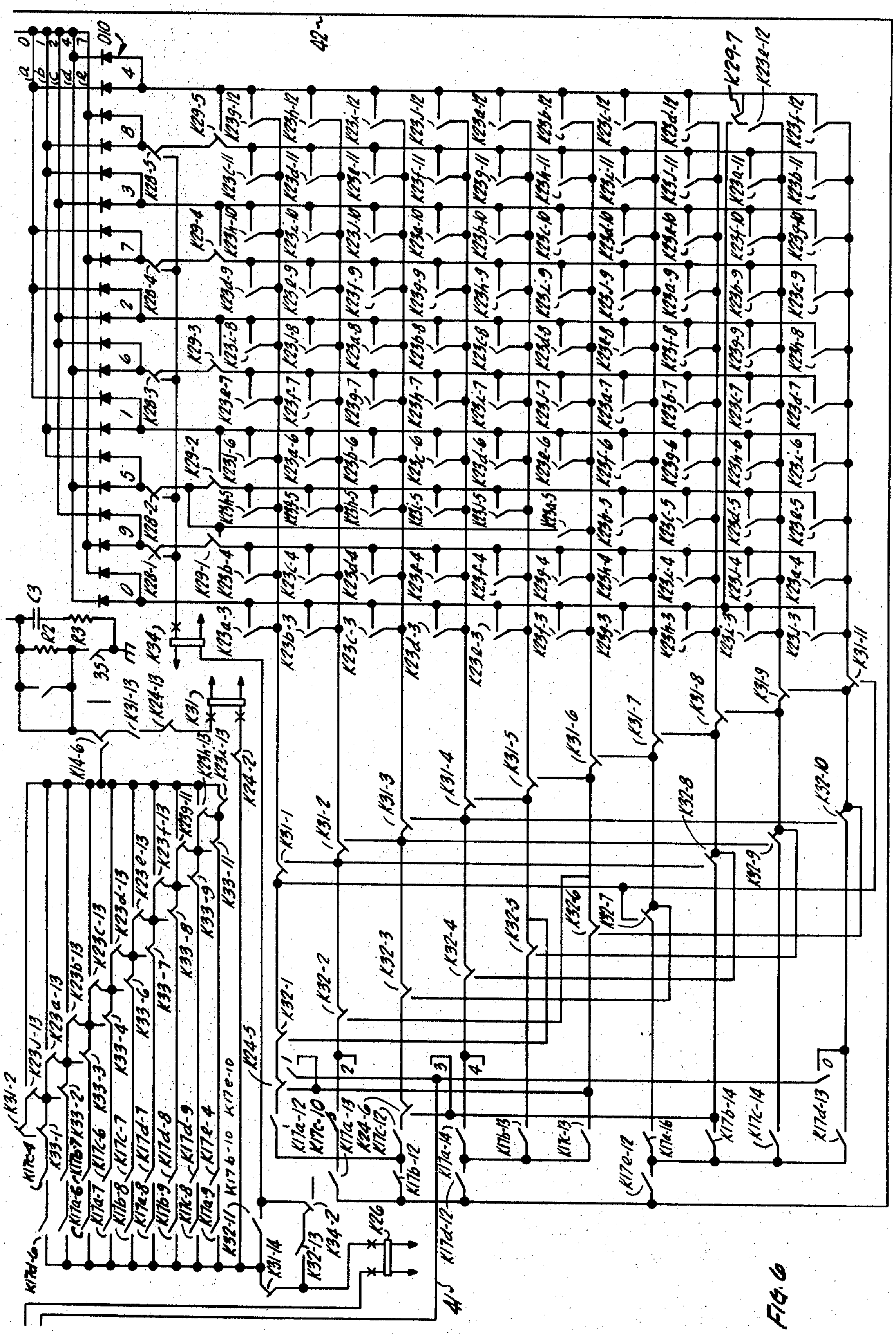

Any of the contacts of the set of contacts of relays K2*a/e* that are closed connects the storage bus B14 to ground over a circuit that extends from ground through contacts 35 (FIG. 6) on the hold relay (not shown), resistor R2, and ground bus 16 to the storage relay contacts K2*a/e*–1. The resistor R2 and contacts B5 are bridged by spark suppressing R*c* circuit comprising resistor R3 and capacitor C3.

The storage tank holds the stored information in a two-out-of-five code, so the grounds received over the storage busses B14 operate two of the five relays in relay set K17*a/e*.

Means are provided for translating the two-out-of-five code. In greater detail, translator control relay K22 (FIG. 7) also operates responsive to the operation of relay K1. The operate circuit for relay K22 extends from battery through the winding of relay K22, closed contacts K1902, closed contacts K21–3, operated contacts K1–4 and closed contacts K12–2 to ground.

A set of 10 relays K23*a/j* are provided to accomplish the translation in this embodiment to a decimal code. Contacts K22–1 to K22–10 close to prepare the operation of decimal relay set K23*a/j*. The decimal relays are operated as a function of which two-out-of-five relays are operated of relay set K17*a/e*.

By way of example, assume that the connect time minute units that are stored is a 2 (0,2 in the two-out-of-five code). Then, relay K23*b* will operate when relays K17*a*, K17*c* operate. The operate circuit for relay K23*b* extends from battery through the winding of relay K23–*c*, operated contacts K22–2, normally closed contacts K24–2, operated contacts K17*c*–1, K17*a*–4, K22–11, normally closed contacts K21–4, operated contacts K17*a*–5, closed contacts K17*b*–6, K17*e*–3, K17*d*–3, operated contacts K17*c*–5 and contacts K14–3 to ground.

The other K23*a/j* contacts operate in a similar manner depending on which two-out-of-five K17*a/e* relays are operated by the stored connect time minute units store relays. Thus, the two-out-of-five code is translated to the decimal code represented by relays K23*a/j*. The decimal relays lock themselves operated over a circuit that includes contacts K23*a/j*–1, normally closed contacts K14–4 and operated contacts 17 of the noted hold relay (not shown) to ground.

Means are provided for reading out the disconnect minute units that have previously been stored in storage relay set K31*a/e*. More particularly, a sequence mark relay K26 (FIG. 6) is operated over a circuit that extends from battery, through the winding of the K26 relay through normally closed contacts K14–5, operated contacts K23*a/j*–2; contacts K17*a/e*–11 to ground bus 36. Bus 36 is grounded through resistor R2 and operated contact 34 of the hold relay (not shown). The resistor R2 and contacts 35 are bridged by the series R*c* circuit including resistor R3 and capacitor C3.

Responsive to the operation of the mark relay K26, the release relay K19 (FIG. 2) operates over a circuit that extends from battery through the coil of relay K19, normally closed contacts K21–5, operated contacts K26–2, normally closed contacts K21–6 to ground bus 36. The operation of the release relay K19 opens the operate circuit of relay K22 in an obvious manner. The return to normal of relay K22 prevents any further operation of the relays K23*a/j*. The operated relays of the set of relays K23*a/j* are locked operated through the contacts K23*a/j*–1, K26–6 and 37 to ground.

Figures 3, 4, 7, 8, 9:
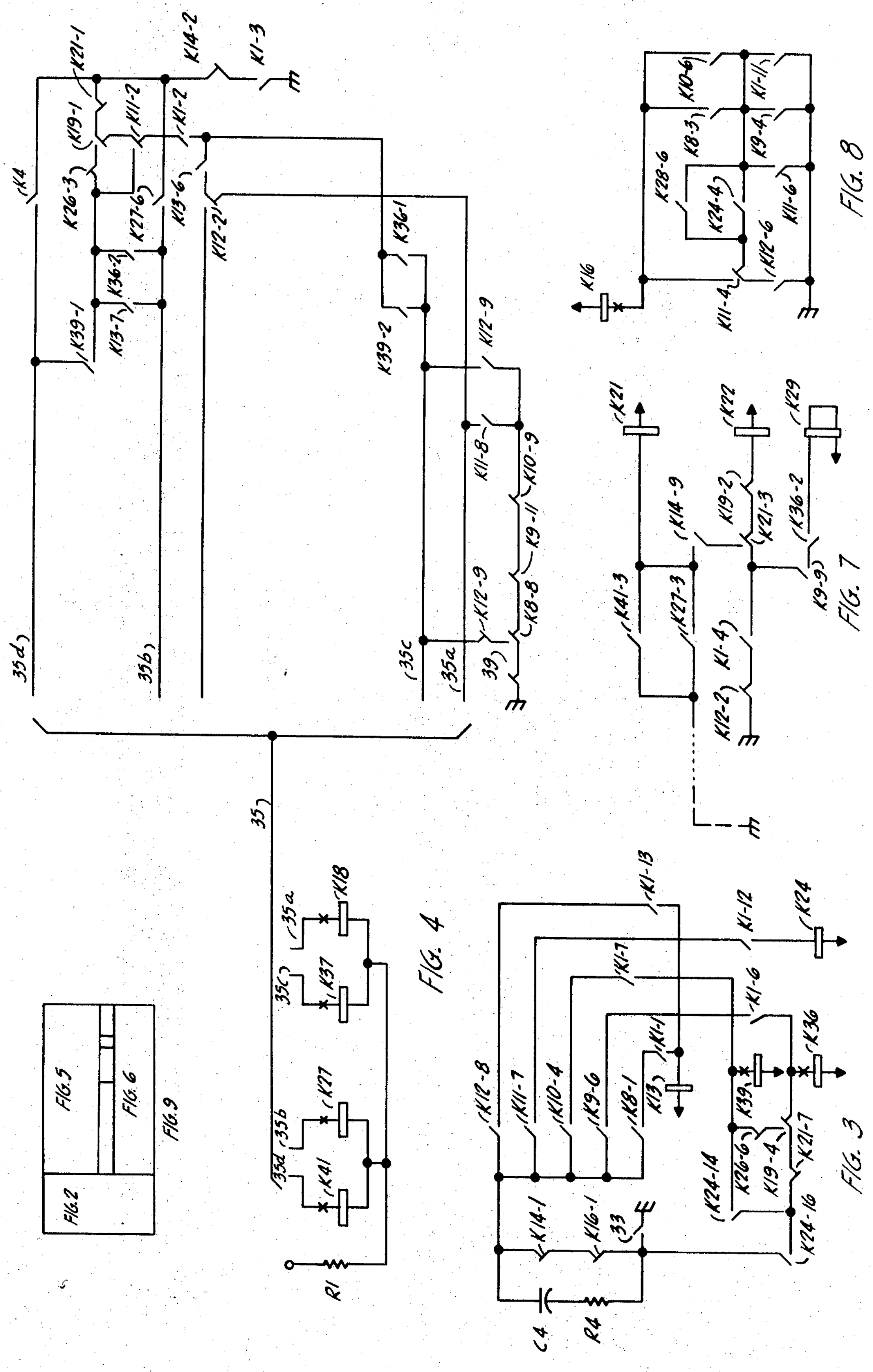

The operation of release relay K19 also opens the operate circuit of the sorting relay K18 in an obvious manner by opening contacts K19–1 (FIG. 4). The release of relay K18 prevents the operation of any further relays K17*a/e* and causes relays K17*a/e* to release over an obvious circuit through contacts such as contacts K18–1*a*. Relay K26 also releases when contacts K17*a/e*–11 open removing the operating ground from relay K26.

Sorting relay K27 (FIG. 4) now operates over a circuit that extends from resistance battery through the coil of relay K27 to point 35*b*, through cable 35, from cable 35 to point 35*b*, through operated contacts K13–7, normally closed contacts K26–3, operated contacts K19–1, and normally closed contacts K21–1, K14–2 and through operated contacts K1–3 to ground. Responsive to the operation of relay K27, relay set K17*a/e* reoperates from grounds received over the contacts of the relay of the set of relays attached to the storage busses B17 through contacts K21–2. The relay K31*a/e* is the set of relays that stores the disconnect time, minute units in a two-out-of-five code. Ground is received from ground bus 36, through contacts K26–3, contacts K31*a/e*–1, contacts K27–2 to the storage busses B17. This ground causes the relay set K17*a/e* to operate over the previously noted path to store the disconnect time minute units digit.

Means are provided for dropping the storage relays K31*a/e*. More particularly responsive to the operation of the proper relays out of the set of relays K17*a/e* the sequence mark relay K26 reoperates through contacts K14–5, contacts K23*a/j*–2, K17*a/e*–11 to the ground bus 36. Responsive to the operation, of sequence mark relay K26, the mark relay K21 re-operates. The operating circuit for relay K21 extends from battery through the coil of relay K21, operated contacts K27–3 to a ground through mesne relay contacts not shown. Responsive to the operation of relay K26 relay, K31*a/e* drop out. Also responsive to the operation of relay K21, relay K19 drops out. It should be noted that relay K19 locked operated over contacts K19–3 and contacts K1–5 which lead to contacts K21–6, and through those last named contacts to the ground bus 36. At this time the disconnect time minute units is held in a two-out-of-five code on the relay set K17*a/e*.

Means are provided for computing the elapsed time minute units code from the information now stored in the translator and in the set of relays K17*a/e*. In greater detail, a unique reuse of relay set K31*a/e* is now made. Responsive to the release of relay K19, the relay set K31*a/e* reoperates to indicate the elapse time of the minute unit code. Thus, the particular relays of the relay set K31*a/e* that reoperate indicate in a two-out-of-five code the elapsed minutes time in units.

Thus, by way of example, if the connect time minute units code is 2, relay K23–*b* is still operated. If the disconnect minute unit time is "1," then relay K17–*a* and K17–*b* (0, 1 in the two-out-of-five code) are operated. Ground then is available through relay contacts K14–3 normally closed contacts K17*c*–5, K17*d*–5, K17*e*–4, operated contacts K17*b*–6, K17*a*–5, K21–4, normally closed contacts K19–3, operated contacts K17*b*–12, K17*a*–12, closed contacts K24–5, K32–1, K31–1, operated contacts K23*b*–4, normally closed contacts K29–1 and K28–1 to the diode gate 9 of diode set D10 to busses *e* and *c* leading to the storage busses B17 through contacts K13–1/5*b*. The ground is then transferred through busses B17 and contacts K27–2 to relay set K31*a/e*.

Thus, when the connect time minute units is a "2" and when the disconnect time minute units is a "1," the subtraction computation provides a "9" that is stored in storage tank K31*a/e*. Accordingly, the two-out-of-five relays that would operate in the set of relays K31*a/e* would be the relays indicating the digit "2" and the digit "7."

It should be noted that responsive to the operation of relay K21 (FIG. 7) contacts K21–2 opened to remove the operating path for relays K17*a/e* from the storage busses. The set of relays K17*a/e* remain operated over a path that extends from battery through the coil of relays K17*a/e*, through contacts K17*a/e*, contacts K27–4, contacts K14–4, and contacts 37 to ground.

At this point the first computation sequence is complete and the resulting number is stored. Accordingly, sequence relay K14 (FIG. 2) operates to indicate the completion of the sequence. The operating path of relay K14 extends from battery through the coil of relay K14, the closed contacts K14–6, operated contacts K17*a/e*–11 to ground bus 36. It should be noted that relay K14 cannot operate while relay K19 is operated since contact K19–3 is operated. Thus, relay K14 operates after the release of relay K19 over the circuit described.

Means are provided for adjusting for a larger connect time than disconnect time code. In greater detail, if the connect time is larger than the disconnect time, then relay K31 (FIG. 6) operates at this time. The operate circuit for relay K31 extends from battery through the coil of relay K31, closed contacts K24–2, contacts on the relays of K17*a/e* that are operated. In the example given where the disconnect time minute units is "1," the operated relays would be K17–*a* and K17–*b*. Therefore, the operate circuit would extend through operated contacts K17*a*–6, K17*b*–7, contacts K33–2, contacts K23*b*–13. Where the connect time is "2," the K23–*b* relay is held operated through the following circuit: battery through the coil of relay K23–*b*, contacts K23*b*–13, operated contacts K14–6 to ground through contacts 34 on the hold relay. By observing the contacts of the contact field, it is apparent that relay K31 operates only in the event that the connect time is larger than the disconnect time.

If the connect time is equal to or less than the disconnect time then relay K31 does not operate. In any event, relay K9 (FIG. 2) operates at this point. The operate circuit for relay K9 extends from battery through the coil of relay K9, normally closed contacts K12–2, operated contacts K8–2, and operated contacts K14–6 to ground. Of course, relay K8 has been held operated from the beginning of the sequence over the circuit that extends from battery through the coil of K8 through contacts K8–1 and through contacts K14–6 to the ground previously noted.

If the connect time is larger than the disconnect time then relay K26 returns to its normal unoperated condition. The return to normal of relay K26 occurs responsive to the operation of relay K31, when contacts K31–4 open while contacts K14–5 are open. The original operate circuit was opened responsive to the operation of relay K14, (sequence relay). The hold circuits for relay K26 for use after the operation of relay K14 extends from battery through the coil of relay K26, through contacts K31–4 and through the contact matrix to the ground used for the operation of relay K31. However, when relay K31 operates, contacts K31–4 open to remove the hold circuit and enable relay K26 to return to its normally unoperated condition.

At this time, the relay K16 which checks that the sequence of the steps donated by relay K8 and K12 operates. The operate circuit for relay K16, at this time, extends (FIG. 8)

from battery through the coil of relay K16 through operated contacts K8–3 and K9–4 to ground.

Responsive to the operation of relay K16, the next sequence starts. Relay K14 returns to normal since its hold circuit through contacts K16–2 and K14–6 to the ground bus is operated. The operate circuit of relay K14 is also opened when relay K27 returns to normal causing relay contacts K27–5 to open.

If the connect time is equal to or less than the disconnect time, then relay K8 returns to its normal unoperative condition, responsive to the return to normal of relay K14 while relay K9 is operated. This occurs responsive to the return of contacts K14–6 to their normal open position, thus, opening the K8 operate circuit. The K8 hold circuit is opened responsive to the operation of relay K9, which consequently opens contacts K9–1.

Responsive to relay K8 returning to normal while relay K9 is operated relay K16 returns to normal. This occurs due to contacts K8–3 returning to the normal open condition thereby opening the operate circuit of relay K16.

At this time the selection or sorting relay K36 operates. This is one of the selection relays used in reading the stored information. The operate circuit for relay K36 extends from battery through the coil of relay K36 through operated contacts K1–6, operated contacts K9–6, normally closed contacts K14–1, normally closed contacts K16–1 and through operated contacts 33 to ground. Thus, relay K36 operates when relay K9 is operated and relays K14 and K16 return to normal.

If the connect time is larger than the disconnect time then relay K33 operates. The operate circuit for relay K33 extends from battery through the coil of relay K33 through normally closed contacts K14–8 and through operated contacts 31–6 to ground. Paralleling contacts K14–8 are hold contacts K33–1 on relay K33. At this time relay K31, however, remains operated over a hold circuit extending from battery through the coil of relay K31, contacts K24–13, K31–13 and K14–6 to ground. This circuit, of course, as will be subsequently explained, that is, the operation of the relay K31, K33 acts to adjust the next computed elapsed time code for the fact that the connect time code of the previously read stores was smaller than the disconnect time code. At this juncture, relay K37 (FIG. 4) operates to select the next storage tanks to be readout. In this embodiment the next storage tanks are the connect time minute tens code storage relays i.e., the set of relays K4*a/e*. The operate circuit of relay K37 extends from battery through resistors R1, the coil of relay K37 to point 35*c*, through the cable 35 to point 35*c*. Through operated contacts K36–1, contacts K1–2, closed contacts K11–2, contacts K19–1, contacts K21–1, contacts K14–2 and through operated contacts K1–3 to ground.

Elapsed Time Minute Tens Computation

The circuitry is now in condition to read the connect time minute tens code. Once again two of the set of five relays K17*a/e* operate. This time the operation occurs through the K36 and K32 relays to select the two-out-of-five code designating the number stored in the connect time minute tens storage relays K4*a/e*. In a manner previously described, the appropriate relay of the set of K23*a/j* relays operate to translate the information stored in the two-out-of-five code of the K17*a/e* relays. For example, if the connect time minute tens stored was "3," then relay K23*c* would be operated. Relay K26 reoperates responsive to the operation of the readout relays K17*a/e* and the translation relays K23*a/j* over contacts K14–5, K23*a/j*–2 and K17*a/e*–11 to the ground bus. Responsive to the operation of relay K26, relay K19 operates over the previously described circuit to open the operation path of relay K22 to prevent any further operation of the relays. Relay K23*c* is locked operated through contacts K23*c*–1. Thus, the connect time minute tens code is now stored in the contact field of the relays K23*a/j* and K17*a/j*.

Means are provided for accounting for a connect time minute units code that is larger than the disconnect time minute units code. More specifically, relay K29 (FIG. 7) operates. The operate circuit for relay K29 extends from battery through the coil of relay K29 through contacts K36–1, K4–9, K1–4 and contacts K12–2 to ground.

Responsive to the operation of relay K29, relay K32 (FIG. 5) operates. The operate circuit for relay K32 extends from battery through the coil of relay K32, operated contacts K22–12, operated contacts K29–6 and contacts K2*a/e*–1 on the set of relays K2*a/e* to ground bus 36. The K2*a/e* relays store the connect time hour tens information. The operation of relay K32 causes contacts K32–1 through K32–10 to operate to change the contact Matrix used in the evaluation of the elapsed time. More specifically the operation of relay K32 adds four units to the time stored in the contact field for evaluation of the hour unit digits.

Responsive to operation of relay K32, relay K38 (FIG. 2) operates over a circuit that extends from battery on relay K38 through the coil of relay K38, contacts K32–12 and through contacts K32*a/e*–1 on the set of disconnect hour tens store relays K32*a/e* to the ground bus 36. The operation of relay K38 prepares a path for the grounding of storage busses through contacts on the K24 relay.

After the operation of relay K19, relay K22 and K37 return to normal. Relay K22 returns to normal in a manner which has previously been described, including the opening of contacts K19–2. Relay K37 returns to normal when contacts K26–3 open responsive to the operation of relay K26. The connect time minute tens code is removed when relays of the relay K17*a/e* return to normal in a manner previously explained. In addition, relay K32 returns to normal responsive to the return to normal of relay K22 and the consequent opening of contacts K22–12. K26 then returns to normal in a manner previously explained.

Relay K27 now reoperates in a manner explained to select the disconnect time minute tens storage relays for reading.

The circuit now reads the disconnect time minute tens information. Relay K17*a/e* reoperates from the ground received over the storage busses B17. More particularly, two out of five of the relays K17*a/e* operate over circuits that extend from battery through the coil of relays K17*a/e*, contacts K21–2, K36–1/5*b*, K27–1, K29*a/e*–1 and contacts K26–4 to ground bus 36. Relays K17*a/e* lock over the circuit that extends from battery through the coils of relays K17*a/e*, contacts K17*a/e*–1, K27–4, K14–4 and contacts 37 to ground. If here, for example, the disconnect minute ten is "0," relays K17*d* and K17*e* are locked operated. Relay K26 reoperates over a circuit previously described. Relay K21 also reoperates over a circuit previously described. Relay K21 also reoperates to open the operate path of relay K17*a/e*, the operating path of relay K21 including contacts of relays K17*a/e*.

The relays K29*a/e* return to normal responsive to contacts K26–4 and contacts K21–2 operating to the open position. It should be noted that contacts K9–7 are also operated at this time while contacts K8–6 are in their normal open position.

Means are provided for computing and storing the elapsed time minute tens information. More specifically, two of the five relays of the relay set K29*a/e* reoperate at this time responsive to the connect and disconnect times stored in the contact field to mark the elapsed time minute tens code. In the example given when the connect time tens digit is "3" and the disconnect digit is "0," the relays K29*b*, K29*c* operate. The operate path extends from battery through the coils of the K29*b* and the K29*c* relays, operated contacts K27–1, busses B17, contacts K36–2*a* and K36–3*a*, through cable 41 to conductors *b* and *c* through diode gate 3 of diodes 10, operated contacts K29–4, operated contacts 23*c*–9, normal contacts K31–11, contacts K32–10, operated contacts K17*d*–13, contacts K17*e*–12, cable 42, contacts K19–3, K17*a*–5, K17*b*–4, K17*e*–2, K17*d*–4, K17*c*–5 and contacts K14–3 to ground. In the example given the stored elapsed time minute tens digit is "3." If the relay K29 was not operated, then the path would extend through diode gate 7 and the number 7 would be stored in the K29*a/e* relays. This, of course, indicates 70 minutes which is impossible. Thus, relay K29 limits the elapsed time minutes ten digit to "5."

Relay K14 operates to indicate the elapsed time minute tens sequence is complete. The operation occurs over the previously described circuit. Relay K10 operates to start the next sequence, that is the elapsed hour unit time computation. The operate circuit for relay K10 (FIG. 2) extends from battery through the coil of relay K10 through operated contacts K9–8, normal contacts K8–2, and operated contacts K14–6 to ground. Relay K10 locks operated over a circuit that extends from battery through the coil of relay K10 through the contacts K10–1, K11–1, K12–1, and through contacts 32 to ground. The relay K16 then reoperates over the circuit previously described to check that the sequence is stepped. Relays K36, K29 and K27 return to the normally unoperated condition at this time. The operating circuit of relay K36 opens responsive to the operation of relay K14 when contacts K14–1 open. In a similar manner relay K27 returns to its unoperated condition responsive to the operation of relay K14. As previously described, relay K29 is returned to normal responsive to the return to normal of relay K36. The relay K29 which assures that the tens digits can only go up to six returns to normal when contacts K36–2 open.

If the connect time is equal to or larger than the disconnect time, then relay K26 returns to its normal condition at this time, as previously described.

If the connect time is less than the disconnect time, then relay K31 returns to its normal unoperative condition since relay K14 is operated breaking the hold circuit of relay K31 which extends through contacts K14–6. Similarly relay K33 also returns to its normal unoperated condition. This occurs since contacts K31–6 open and the operate circuit of relay K34. If the connect time is larger than the disconnect time relay K31 reoperates through the switch matrix and contact K14–6 as previously described. In any case, relay K26 returns to its normal unoperated condition responsive to the operation of K31, while relay K14 is operated.

Elapsed Time Hour Units Computation

The control unit now prepares for the next sequence. Responsive to the return to normal of relay K26, the set of relays K17*a/e* and K23*a/j* return to their normal unoperated condition in a manner previously described. Relay K33 then reoperates in a manner previously described if relay K31 is operated. Relay K9 returns to its normal unoperated condition responsive to relay K14 returning to its unoperated condition and the contacts K14–6 opening. The checking relay K16 returns to its unoperated condition in a manner previously described.

To prepare the K17*a/e* relay for reading the stored information the mark relay K21 returns to an unoperated condition responsive to K14 returning to its unoperated condition in a manner previously described. To prepare the translating relays K23*a/j*, the relay K22 operates responsive to relay K21 returning to its unoperated condition as previously described.

Means are provided for detecting and limiting the ticketing of calls to a maximum number of hours. Relay K28 (FIG. 5) operates for the first time over a circuit that extends from battery on relay K28 through the coil of relay K28, contacts K22–13, contacts K10–3, K14–4 and contacts 37 on the hold relay to ground. A locking circuit is prepared when contacts K28–1 close to bridge contacts K22–13. The operation of K28 opens contacts K28–1 to K28–5. These contacts disconnect the diode gates 5–9.

Means are provided for accommodating calls that begin before midnight and end after midnight. In greater detail, relay K32 operates over a circuit that extends from battery on relay K32 through the coil of the K32 relay, operated contacts K38–3, K50–2 to ground bus 36.

The sorting relay K39 (FIG. 3) now operates to select the connect time hour units information in cooperation with relay K37. The operating circuit for relay K39 extends from battery through the coil of relay K39, through operated contacts K1–7, K10–4, normal contacts K14–1, K16–1, and operated contacts 33 to ground. At this point relay K37 reoperates over previously described circuits.

The apparatus is now in condition to read the connect time hour units code. Thus, sets of relays K17*a/e* and K23*a/j* operate as previously described to read and translate the two-out-of-five code stored in relays K3*a/e*.

At this time, responsive to the operation of the sets of relays K17*a/e* and K23*a/j* relay K26 reoperates as previously described along with relay K19 as previously described. Relay K22 returns to its unoperated condition responsive to the operation of relay K19 when contacts K19–2 open. Relay K37 also returns to its unoperated condition at this point since its operating circuit is also opened with the operation of relay K19 and the consequent opening of contacts, K19–1 as previously described.

The apparatus now is in condition to remove the connect time hour unit code from the storage tank relay K3*a/e*. The relays of the set of relays K17*a/e* returns to normal since the contacts K37–2 in the hold circuit also open. Relay K26 also consequently returns to normal in a manner previously described when contacts k17*a/e*–11 open.

Selection relay K41 operates at this time (FIG. 4). The operate circuit for relay K41 extends from battery through resistors R1, through the coil of relay K41 to point 35*d* and at the cable 35. The other end of cable 35 comes out again at point 35*d* and proceeds through operated contacts K39–1, normal contacts K26–1, operated contacts K19–1, normal contacts K21–1, K14–2, and through operated contacts K1–3 to ground. A hold path is prepared for relay K41 through its own contacts K41–1.

The apparatus is now in condition to read the disconnect time hour unit code. The set of read relays K17*a/e* now reoperate to temporarily store the disconnect time. The operate circuit for the set of relays K17*a/e* now extends from battery through the coil of relays K17*a/e*, contacts K21–2, contacts K39–1/5 through the storage busses B16, operated contacts K41–2, operated contacts K28*a/e*–1 and contacts K26–7 to the ground bus 36. Responsive to the particularly operated relays of set of relays K28*a/e*, which is dependent on the information stored denoting the hour units of the disconnect time, the proper relays of the set of relays K17*a/e* now operate.

Assuming by way of example, that the connect time hour units were "0," the relay K23*j* would be operated. If the disconnect hour units were "2," the relays K17*a*, K17*c* would now be operated.

The circuitry now prepares to restore the computed elapsed time hour units in the storage tanks or relays. Relay K26 reoperates at this time over previously described circuits extending through relay contacts on the relays K17*a/e* and K23*a/j*. Relay K21 operates over a circuit that extends from battery through contacts K41–3 to a temporary ground through mesne relay contacts not shown, but indicated by the dashed lines.

Responsive to the operation of relay K21, relay K22 returns to its unoperated condition when contacts K21–3 operate. Also at this time relay K28*a/e* returns to its unoperative condition responsive to contacts K26–7 opening while contacts k21–2 are opened.

The unique reuse is now made of relay K28*a/e*, the disconnect hour units storage relays. They are reoperated to read the elapsed time hour unit code. The reoperate circuit extends from battery through the coils of relay K28*a/e* through storage bus B16, contacts K39–1 through the gates made up of a diodes D10 and through the contact matrix to ground.

If the elapsed time hour units are less than five, the appropriate two-out-of-five relays of relay set K28*a/e* operate. In the example used thus far, where the connect time hour unit is "0," and the disconnect time hour unit is "2," then either relays K28*d*, K28*c* or K28*a*, K28*b* operate depending on whether relay K31 is operated. The operate circuit for these two relays extends from battery through the relay coils, contact K41-2, storage busses B26, contacts K39-1/5*a*, and over cable 42. Now, the diode gate that is open depends on whether relay K31 is operated. The operation of relay K31 indicates that the connect minute tens digit 13 is larger than the disconnect minute tens digit; since the operate circuit of relay K31 extend through a contact field which unables the relay only if the connect time is larger than the disconnect time. If relay K31 is operated then gate 1 is open, battery passes through conductors *a*, *b* through diode gate 1, contacts 23*j*-6, K31-1, K17*c*-10, K17*a*-13, cable 42, contacts K19-3, K21-4, K17*a*-5, K17*b*-6, K173-3, K17*d*-3, K17*c*-5 and through contacts K14-3 to ground.

If the relay K31 is not operated, then gate 2 is opened and battery extends through diode gate 2, contacts K23*j*-8, K31-2, K32-2, K17*e*-10, K17*a*-13 and through the previously traced circuit to ground. According to the example being used herein, the gate 1 is open and relays K28*a*, K28*b* store the elapsed hour unit digit which is "1."

Means are provided for limiting the hour units to "5." More particularly, if the elapsed hour unit digit is 5 or greater, then relay K34 operates over a circuit that extends from battery through the coil of K34 to the contacts K28-1 to K28-5. Since relay K28 is operated during this sequence ground is transferred through one of these contacts if the elapsed hour units digit is "5" or greater. For example, if the connect time hour units were "1" and the disconnect time hour units were "6" then relays K23*a*, K17*c*, K17*d* would be operated so that ground would be transferred through contacts K14-3, K17*c*-5, K17*d*-3, K17*e*-2, K17*b*-4, K17*a*-5, K21-4, K19-3, K17*d*-12, K17*c*-13, K32-6, K31-5, and contacts K23*a*-5 to contacts K28-2 to operate relay K34.

Relay K34 locks operated after relay K14 operates over a path that extends from battery on K34 through the coil of K34, contacts K32-11, K17*d*-6, K17*c*-14, K33-1, K23*a*-13, K14-6, and contacts 34 to ground.

The operation of relay K34 prepares an operate path for relay K12 so that relay K12 operates as soon as relay K14 operates. The operation of relay K12 causes the printer or perforator to be called in and the stored computed information to be transferred to the printer or perforator.

Whether the elapsed time hour unit digit is under "5" or over "5," at this time relay K14 operates over a previously described circuit. Responsive to the operation of relay K14, relay K41 returns to its normal unoperated condition when contacts K14-2 open the operate circuit for relay K41. Also, relay K39 returns to its unoperated condition when contacts K14-1 open the operate circuit of that relay.

If the connect time is equal or larger than the disconnect time, and the elapsed time hour units digit is less than 5, then relay K34 operates at this time through the previously described hold circuit. If the connect time is less than the disconnect time, relay K31, K33 return to their normally unoperated condition. This occurs because the hold circuit for K31 is opened by the operating of contacts K14-6 in the hold circuit and because there is no present path through the contact field of the operate circuit of relay K31. Relay K33 of course, drops when contacts K31-14 open. If the relays K31 and K33 were not operated and the connect time is larger than the disconnect time, then relay K31 operates through the contact field. Of course, when relay K31 operates, relay K33 operates when relay K14 returns to its unoperated condition as previously described. At this time relay K34 also is held through the contact field, as previously described.

In any event, relay K26 returns to its unoperated condition responsive to the operation of relay K14 while relay 34 is operated. Responsive to relay K26 returning to its normal condition the relay sets K17*a/e* and K23*a/j* return to their normally unoperated condition because ground is no longer available through contacts K14-4 and K26-4. Also at this time, relay K28 returns to its unoperated condition because of the opening of relay contacts K26-4 and relay contacts K14-4. Relay K32 returns to its unoperated condition when contacts K28-16 open.

If relay K34 is previously operated it now returns to its unoperated condition when contacts on the K28 relay and on the K32 relay open. The operation of relay K34 causes relay K12 to operate, relay K12 causes relay K21 to return to normal.

If relay K34 drops out at this time and returns to its unoperated condition then relay K11 operates over circuit that extends from battery through the coil of relay K11 through contacts K34-3, K28-6, K1-8, K10-3, K9-8, K8-2, K14-6 to ground. The operation of relay K11 also operates contacts K11-1 to open the locking circuits for relays K8, K9, K10 and to prepare a locking circuit for relay K11. Responsive to the operation of relay K11 while relay K14 is operated, relay K16 reoperates through contacts K11-4 and K12-6, (see FIG. 8).

At this time relay K14 returns to its normally unoperated condition and responsive thereto relay K33 operates since relay K31 is operated if the connect time is larger than the disconnect time, as previously described. Also responsive to the return to normal of relay K14, relay K10 returns to its unoperated condition when contacts K14-6 open while contacts K11-1 are open.

Relay K21 returns to its unoperated condition when contacts K14-9 open while contacts K41-3 are open. Responsive to the release of relay K21, relay K22 operates over previously described circuit. Responsive to the release of relay K10, relay K16 also releases when contacts K10-6 open.

Elapsed Time Addition

The circuitry now prepares to convert the elapsed time stored in minutes and hours to elapsed time minutes stored in tens and units. Relay K24 (FIG. 3) operates responsive to the operation of relay K11. The operate circuit for relay K24 extends from battery through the coil of relay K24 through operated contacts K1-12, K11-7, through normally closed contacts K14-1 and K16-1 and finally through closed contacts 33 to ground. Selectively, relay K36 now reoperates through a circuit that extends from battery through the coil of relay K36 over normal contacts K19-4, K21-7, operated contacts K24-16 and through operated contacts 33 to ground. Relays K31 and K33 return to normal responsive to the operation of relay K24. First relay K31 returns to normal when contacts K24-13 and K24-2 open. Relay K33 returns to normal when contacts K31-14 open. The cooperating selecting relay K27 operates through contacts K14-2 and K1-3 to ground over the previously explained circuit.

The apparatus is now prepared to read the elapse time minutes tens stored in relays K29*a/e*. The relays of set K17*a/e* operates through the ground received over contacts K29*a/e*, K27-1, storage busses B17, contacts K36-1/5*a* and K21-2. Then the proper translate decimal relay of the set K23*a/j* operates as previously explained. Relay K26 operates at this time over previously described circuitry. Then relay K19 operates through a previously described circuit including contacts K21-5. Responsive to the operation of relay K19, relay K22 returns to normal when contacts K19-2 open, as previously described. Also relay K37 returns to normal responsive to the opening of contacts K19-1 as previously described. Similarly, relay K36 returns to normal responsive to the opening of contacts K19-4.

Since relay K14 reoperates through contacts K27-5 over a previously described circuit, the hold ground is removed from relays K17*a/e* as previously described. Thus, the relays K17*a/e* return to normal. Relay K26 also returns to its unoperated condition responsive to relay contacts K17*a/e*-11 opening.

The sorting or selecting relay K39 reoperates over previously described circuits including normally closed contacts K26-6, operator contacts K19-4, normally closed contacts K21–7, operator contacts K24–16 and through operator contacts K2 K33 to ground. Responsive to the operation of relay K39 at this time relay K41 reoperates over an obvious previously described circuit to enable access to the K28*a*/*e* relays reading the elapsed time hour units.

The apparatus is now in condition to read the elapsed time hour unit through selection relay contacts on relays K41 and K39. The selected relays of the set of relays K17*a*/*e* operate in accordance with the digit stored in relays K28*a*/*e*. Responsive to the reoperation of relays K17*a*/*e*, relay K26 reoperates over a previously described circuit.

Means are provided for using a 2/5 tank for storing minute tens information up to 300 minutes. More particularly, if the hour unit digit is "1" and the minute tens digit indicates "4" or higher, or if the hour unit digit reads "3" and the minute tens digits are "2" or higher, then relay K42 operates. The operate circuit extends from battery on the relay K42 through the coil of relay K42 and through a contact network made up of contacts of the K17*a*/*e* and the K23*a*/*j* relays which contacts described the conditions just previously pronounced.

For example, at this time relay K24 is operated and the minute tens digit is stored in relays K23*a*/*j*. As has been previously discussed, the maximum tens digit stores is "6." Thus, only one of the relays K23*c*—K23*j* are operated. (Contacts K24–1 to K24–4 are closed to give the converse of digits "1" —"4.") Therefore, relay K42 operates through contacts K17*b*–17, K17*c*–17, then through contacts K23*e*–17 or K23*f*–17 or K23*g*–16 or K23*h*–16. Alternatively the operate path extends through contacts K17*a*–17, K17*b*–18, then through contacts K23*e*–16 or contacts K23*d*–16. The operate circuit further extends through contacts K39–6, K24–16 and 32 to ground. A locking path extends through contacts K42–1. Contacts K42–4 operate to extend a ground mark toward the printer or perforator to indicate when the elapsed time minutes is over 100 or 200.

At this time relays K26 and K21 operate over a previously described circuits, consequently relay K22 releases as previously described. In addition, relays K28*a*/*e* also release when contacts K26–7 open responsive to the operation of relay K26.

If the minutes are less than 300 and more than 199, then relay K43 (FIG. 2) operates over a circuit that extends from battery through the coil of relay K43 through contacts K24–17 and through a diode of the diode gates 11 to cable 41. From cable 41 to position 4 on the contact matrix of FIG. 6 where it is grounded over the previously described circuitry.

If the minutes are less than 200 and more than 99 then relay K44 (FIG. 2) operates over a circuit that extends through contacts K24–18 through the one of diodes of diode set D11 to position 2 and to cable 41 and on the other type of cable 41 to position 2 on the contact matrix to ground. The operation of relays K43, K44 extend signals to the printer or perforator to indicate minutes over 100 and 200, respectively. The signal passes through contacts K42–4, then through contacts K43–4 and K44–4 or then through K43–4 and K44–5. The alternate signals enable the printer or perforator to distinguish when the minutes are less than 100, over 100 or over 200 even though only tens and unit digits are stored.

Appropriate relays of relay set K28*a*/*e* reoperate at this time through the contact matrix previously described and particularly through contacts K19–3. The sum of the elapsed time minute tens are thus stored.

Relay K14 then operates through contacts K16–2, K14–6, K24–19 contacts K44–2, or K43–2, K24–1, K41–4, K19–3, K21–5, K26–2, K21–6 to ground bus 36. The operation of relay K14 indicates the end of the reading sequence consequently at this time relay K24 drops, relay K41 would then drop, K25 would drop, K12 would make, relays K17*a*/*e* would drop, K23*a*/*j* would drop, relay K36 would drop and relay K21 would drop.

Relay K12 (FIG. 2) operates at this time over a circuit that extends from battery through the coil of relay K12, operated contacts K11–5 and K14–6 to ground. The operation of relay K12 acts to operate a relay not shown that extends a demand for service signal to the printer or perforator and causes leads 46 to be coupled to the printer or perforator. The readout is then accomplished by the operation of the readout relays K17*a*/*e* responsive to data stored in the tanks. Ground is then transmitted through the K17*a*/*e* contacts to the designated leads 1–0 and also to the leads 100 and 200 when their call lasted longer than 100 or 200 minutes respectively.

To more fully explain the operation of the computations, assume that a direct dialed long distance call is connected at 23:51 and disconnected at 1:02. When the call terminates the connected time is stored in the connect time storage tanks. In this example, the connect time minute units storage relays K5*a* and K5*b* are operated. The connect time minute tens storage relays K4*b* and K4*d* are operated. The connect time hour units relays K3*a* and K3*d* are operated, and the connect time hour tens relays K2*a* and K2*c* are operated.

Similariy, the disconnect time minute units relays K31*a* and K31*b* are operated. The disconnect time minute tens relays K29*d* and K29*e* are operated. The disconnect time hour units relays K28*a* and K28*b* are operated and the disconnect time hour tens relays K32*d* and K32*e* are operated.

The elapsed time minute units digit is computed by first reading out relays K5*a* and K5*b* through the operation of relays K17*a*, K17*b* over contacts K18–1, busses B17, contacts K13–1*b*, K13–2*b*. The operation of relays K17*a*, K17*b* causes relay K23*a* to operate and lock operated. Relay K17*a*, K17*b* return to normal and relays K17*a*, K17*c* operate over contacts K27–2, busses B17 and contacts K13–1*b*, K13–3*b* responsive to the operated relays K31*a* and K31*c*. The relays K31*a*, K31*c* return to normal and the computed elapsed time is stored in relays K31*a*, K31*b* operated through the contact field.

The elapsed time minute tens digit is computed by first reading out relays K4*b*, K4*d* through the operation of relays K17*b*, K17*d* over contacts K37–3, busses B16 and contacts K36–2*a*, K36–3*a*. The operation of relays K17*b*, K17*d* causes relay K23*e* to operate and lock operated. Relays K17*b*, K17*d* return to normal and relays K17*d*, K17*e* operate over contacts K27–1, busses B16, contacts K36–4*a*, K36–5*a* responsive to operated relays K29*d*, K29*e*. The relays K29*d*, K29*e* return to normal and the computed elapsed time minute tens digit is stored in relays K29*a*, K29*b* operated through the contact field modified by the operation of relay K29.

The elapsed time hour units digit is computed by first reading out the relays K3*a* and K3*c* through the operation of relays K17*a*, K17*d* over contacts K37–2, busses B15, contact K39–1*a* and K39–4*a*. The operation of relays K17*a*, K17*c* causes relay K23*c* to operate and lock operated. Relays K17*a*, K17*d* return to normal and relays K17*a*, K17*b* operate over contacts K41–2, busses B15 and contacts K39–1*a*, K39–1*b*, responsive to operated relays K28*a*, K28*b*. The K28*a*, K28*b* relays return to normal and the computed elapsed time hour units digit is stored in relays K28*a*, K28*b* operated through the contact field modified by the operation of relays K31 and K32. It will be recalled that relay K31 operates through a contact field which determines that the connect digit is larger than the disconnect digit and relay K32 operates to provide for a connect time before 12 midnight (2400 hours) with a disconnect time after 12 midnight.

The circuitry now automatically converts the hour units digit of the stored elapsed time to a minute tens digit and adds it to the previously stored elapsed time minute tens digit.

First, the stored elapsed time minute tens digit is read when relays K27 and K36 operate to connect the readout relay K17*a*/*e* to storage tank relays K29*a*/*e*. In our example where the elapsed time minute tens digit is "1," relays K17*a*, K17*b* operate. Responsive to the operation of relays K17*a*, K17*b*, the translate relay K23*i* operates and locks operated. Note, that the prior operation of relay K24 causes relay K23*i* to operate instead of K23*a*. Subsequently, relays K17*a*, K17*b* return to normal to prepare to read out the elapsed time hour unit digit.

The stored elapsed time hour unit digit is read when relays K39 and K41 operate to connect the relays K17*a*/*e* to the storage tank relays K28*a*/*e*. In our example where the elapsed time hour unit digit is "1" relays K17*a*, K17*b* operate and lock operated. Relays K28*a*/*e* return to normal and are reoperated to provide the sum of the elapsed time minute tens digit restored in relays K28*a*/*e*. Thus, relays K28*a*, K28*e* operate over the contact field modified by relay K24 operated to store the elapsed time tens digit "7."

Subsequently, relay K12 operates to cause the printer or perforator to be connected to the terminals leading to the contact field below the relays K23*a*/*e* that is used to transfer information from the elapsed time storage tanks when relay K17*a*/*e* reoperate in the described manner.

It should be noted that it was not necessary to read and restore the elapsed time hour tens digit. This digit is always zero where the times are limited to, for example, 5 hours.

While the principles of the invention have been described in connection with specific apparatus and applications, it is to be understood that this description is by way of example and not as a limitation on the scope of the invention.

What I claim is:

1. An automatic toll ticketing system for automatically providing tickets for billing toll calls, said system comprising memory means for recording ticketing information, ticket producing means operated responsive to computed information derived from said ticketing information, active ticketing control unit means for controlling said memory means and said ticket producing means and for providing said computed information to said ticket producing means, said active ticketing control unit means comprising storage means for receiving and storing said ticketing information including connect time and disconnect time, means in said ticketing control unit means for reading out said stored ticketing information, computing means for computing the elapsed time of a call from said readout information, means for supplying information representing said computed elapsed time to said storage means thereby reusing said storage means, means for supplying said elapsed time information to said ticket producing means, said storage means storing the ticketing information and the computed elapsed time information using a first code, translating means provided for translating said first code to a second code for use in computing said elapsed time, and for supplying said elapsed time to said ticket producing means, said storage means for storing the ticket information including connect time minute units digit storage means, connect time minute tens digit storage means, connect time hour units digit storage means, connect time hour tens digit storage means, disconnect time minute units digit storage means, disconnect time minute tens digit storage means, disconnect time hour units digit storage means, and disconnect time hour tens digit storage means, means including storage busses for selectively coupling said individual ones of said storage means to said readout means, means including said storage busses for disconnecting said readout means from said storage means and for connecting said storage means to said computing means, said computing means operating responsive to the simultaneous operation of said readout means, said translating means, and said means for connecting said storage means to said computing means, sequencing means provided for stepping said ticketing control unit to individually compute the elapsed time digits in the following sequence: minute units, minute tens and hour units, wherein converting means are provided for them converting the minute tens digit and the hour units digit to a total minute tens digit, hundred means provided for detecting and indicating when the total elapsed time minute tens digit is at least "10" and is less than "20," and for detecting and indicating when the total elapsed time minutes tens digit is at least "20" and less than "30,"

said first code being a two-out-of-five code, and said second code being a decimal code, said storage means including a set of five relays with two relays operated for each stored digit, said readout means including a set of five relays with two relays operated responsive to each readout digit, said translating means including a set of 10 relays, first contact field means comprising contacts on said readout relays for operating one of the 10 translate relays responsive to each of the operated two of five readout relays, and said computing means including a second contact field including contacts on said readout relays and said translating relays for extending an operating ground to reoperate selected storage relays to store the computed elapsed time digits.

2. The automatic toll ticketing system of claim 1, wherein said second contact field includes a portion of said first contact field.

3. The automatic toll ticketing system of claim 2, wherein first selection means are provided for selectively connecting individual sets of the storage relays to said storage busses, wherein second selection means are provided for connecting through individual busses of said storage busses to thereby couple through to selected storage relays, wherein readout bus coupling relay means are provided for connecting said selected busses to said readout relays, and wherein release relay means are provided closing said operating ground to transmit said ground from said second contact field to said storage relays to store the elapsed time digits.

4. The automatic toll ticketing system of claim 3, wherein first gate means are provided for connecting said second contact field to said storage busses.

5. The automatic toll ticketing system of claim 3, wherein sequence relay means are provided to first couple said readout relays to said connect time storage relays to readout a connect time digit, to thereby cause the operation of the appropriate translate relay, wherein means are provided for locking said translate relay operated and for uncoupling said translate relays from said first contact field, wherein means are provided for then returning said readout relays to normal, wherein means are operated responsive to said sequence relay means to couple said readout relays to said disconnect time storage relays to readout said disconnect time digit, wherein means are provided for locking said readout relays operated while said disconnect time storage relays return to normal, and wherein means are provided including said sequence relay means and said means for coupling said storage relays to said second contact field for reoperating said disconnect time storage relays responsive to the operating ground extended from said contact field to said appropriate disconnect time storage relay.

6. The automatic toll ticketing system of claim 5, wherein said means for computing the elapsed time digit when said connect digits are larger than said disconnect digits includes digit relay means, third contact field means including contacts on said readout relays and said translate relay means, said third contact field arranged to transmit operating ground to said digit relay means after a sequence wherein the connect time digit read is larger than the disconnect time digit read, and wherein contacts on said digit relay means are included in said second contact field and are operated to vary said field by subtracting "1" from the disconnect digit in the field.

7. The automatic toll ticketing system of claim 5, wherein said stored times are recorded on a 24-hour basis, and wherein said means for computing the elapsed time when the connect time is prior to midnight with the disconnect time occurring after midnight includes connect time relay means, and contact means on said connect time relay means located in said second contact field operated to add "4" to the disconnect hour unit digit.

8. The automatic toll ticketing system of claim 5, wherein said elapsed time minutes tens limiting means includes minute tens limiting relay means operated during the computation of the elapsed time minute tens digit, contacts on said minute tens limiting relay located in said second contact field to subtract "4" from the connect time tens digits "5"—"10."

9. The automatic toll ticketing system of claim 5, wherein said means for limiting said elapsed hour digit includes hour limiting relay means normally operated during the elapsed time hour unit computation, contact means on said hour limiting relay means operated to open said second contact field for digits "5"—"9," and second hour limiting relay means operated responsive to digits "5"—"9" for signaling said ticket producing means to indicate an elapsed time of 5 hours or more.

10. The automatic toll ticketing system of claim 9, wherein said converting means comprises converting relay means.

means including said sequence relay means for operating said converting relay means after the storing of the elapsed time hour unit digit in said storage relays, converting relay contact means in said first contact field for causing the operation of the inverse decimal relays and for modifying said second contact field to cause the conversion of the elapsed time hour units to minute tens and the subsequent addition of the minute tens digits.

11. The automatic toll ticketing system of claim 10, wherein said hundred means comprises a first hundred relay and a second hundred relay, third contact field means comprising contacts of said readout relays and said translating relays, hundreds control relay means operated through said third contact field and through contacts on said converting relay means for selectively controlling the operation of said first and second hundred relay means.